United States Patent Office 2,694,025
Patented Nov. 9, 1954

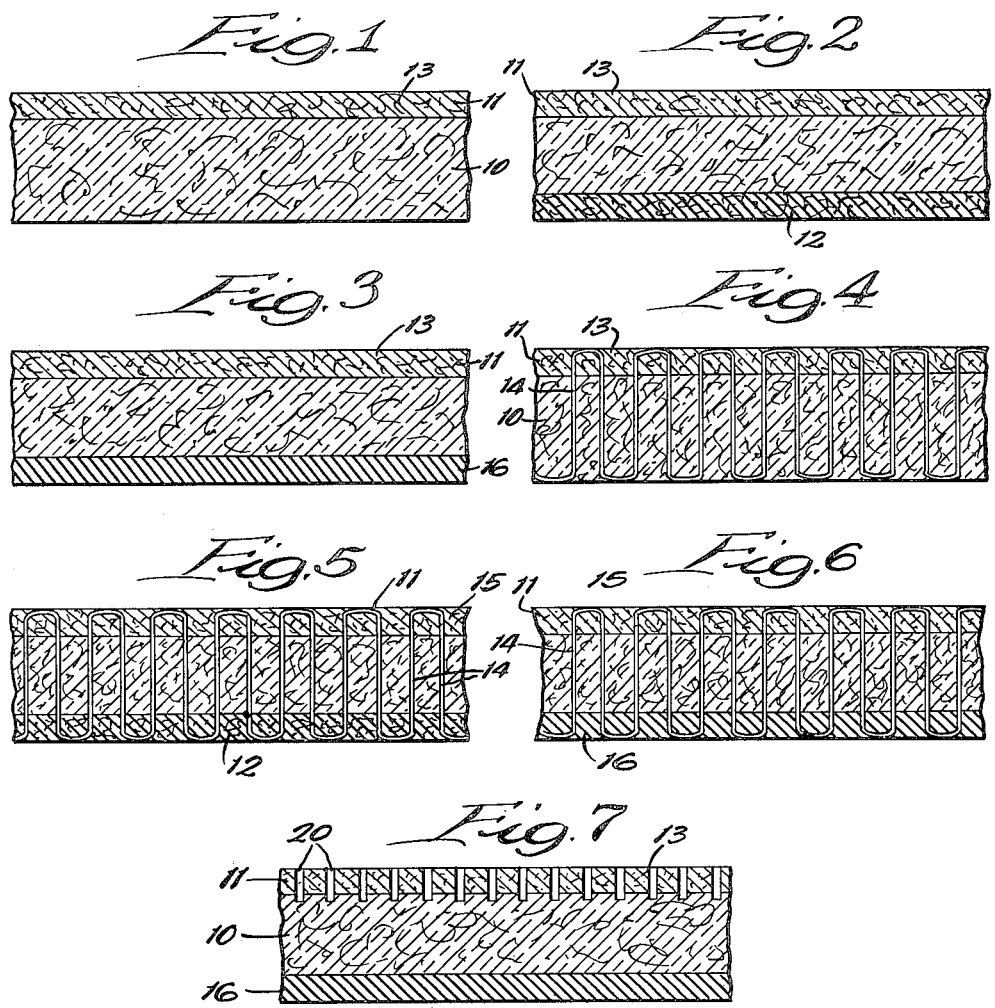

2,694,025

STRUCTURAL PANEL

Games Slayter, Newark, and Marshall C. Armstrong, Hebron, Ohio, assignors to Owens-Corning Fiberglas Corporation, Toledo, Ohio, a corporation of Delaware Application June 27, 1951, Serial No. 233,904

12 Claims. (Cl. 154—44)

This invention relates to the manufacture of structural board, such as partition panels, heat and sound insulation board and the like, and it relates more particularly to paneling of the type described fabricated substantially completely of inorganic materials and which embodies reinforcement in the form of glass fibers for strength and the development of flexibility uncommon to such inorganic cementitious compositions.

It is an object of this invention to produce and to provide a method for producing paneling of the type described characterized by high strength, good heat and sound insulation, fireproofness, and which is composed almost completely of inorganic materials.

Another object of this invention is to produce structural panels of the type described comprising a porous core or base of bonded glass fibers having one or more layers of an inorganic cementitious composition integrated with the surfaces thereof and it is a related object to introduce means in the structure to prevent separation of one part of the structure from another as an incidence to normal use.

A further object is to produce a substantially porous board formed of low cost ceramic materials and to provide an expedient method for producing same.

These and other objects and advantages of this invention will hereinafter appear, and for purposes of illustration, but not of limitation, embodiments of the invention are shown in the accompanying drawings in which—

Figures 1–7 inclusive are schematic sectional elevational views of various modifications in boards embodying features of this invention.

A structural board prepared in accordance with this invention is formed with a central core 10 or base member formed of glass fibers bonded into a self-sufficient, substantially porous, rigid body with a resinous material, preferably of the thermosetting type, such as phenol-formaldehyde resin, urea-formaldehyde resin, furfuryl alcohol-acid catalyzed resin, polyester and unsaturated polyester resins and the like. Base boards or core members suitable for use in the practice of this invention are generally referred to as insulation board fabricated to have a density ranging from 6–20 pounds per cubic foot and preferably in the range of 9–12 pounds per cubic foot. Reference may be made to the patents of Bergin and Simison, No. 2,252,157, issued on August 12, 1941, and No. 2,355,102, issued on November 23, 1943, for manufacture of such porous insulation boards of bonded glass fibers.

Integrated with one or both of the faces of the porous base board 10 are relatively thick layers 11 and 12 of a cured inorganic cementitious composition formulated of gypsum cement and an amide-aldehyde resin present in the ratio of 5–25 parts by weight of amide-aldehyde resin to 95–75 parts by weight of the gypsum cement. Alone the cured cementitious composition is relatively brittle and weak and generally unsuitable for structural board or paneling where strength or flexibility are demanded. It has been found, however, that by the incorporation of a small amount of glass fibers 13 of reinforcing lengths, the strength as well as the flexibility of the board can be materially increased over and above that which normally might be expected by way of comparison with the effect of glass fiber addition in equivalent amounts in the plastics field.

It is desirable to incorporate as much glass fiber in the cement composition as is possible consistent with the ability of working the cement slurry for application and integration of the applied coating with the fibrous, porous base board. Within the limits of water addition permitted for the development of greatest strength, it has been found possible to incorporate as much as 10 percent by weight glass fiber but more often the amount which can be incorporated for economical fabrication lies within the range of about 2–5 percent by weight in the slurry.

The glass fiber component may be incorporated into the slurry in various forms. Cut or chopped staple fibers in filament or yarn form may be used but it is preferred to make use of strands of glass fibers composed of threads or filaments bonded together with a suitable size and cut or chopped to reinforcing lengths of about ¼–4 inches. When a sized fiber is used, excellent results herein are secured when the size employed is melamine-formaldehyde resin or polyvinyl acetate. The former is preferred where high flexure strength is desired while the latter seems to have some degree of compatibility with the slurry so that a better bonding relation between the cementitious composition and the glass fibers is established.

As the amide-aldehyde resinous component, it is preferred to make use of melamine-formaldehyde resin reacting to an intermediate stage of polymeric growth, which may be a water soluble stage capable of reaction under heat and/or catalyst to an advanced cured stage. Instead of melamine-formaldehyde, use may be made of urea-formaldehyde resin, or other amide-aldehyde resins such as guanidine formaldehyde, biguanidine formaldehyde and the like. Such resins are generally incorporated in the slurry as water soluble powders but use may be made of such resinous materals in solutions ranging in concentrations from 30–70 percent by weight. Cure of the resin while in a position of use in combination with the gypsum cement and the reinforcing glass fibers may be effected at a temperature within the range of 150°–350° F. and/or by acidic catalyst, such as mineral acids of the type hydrochloric acid, sulphuric acid or acid salts of the type ammonium chloride, tin chloride, zinc chloride, ferric chloride, aluminum chloride and the like. The amount and type of catalyst generally depends on the type of resin employed. For example, 0.5–0.2 percent by weight of acid salts has been found sufficient for urea formaldehyde resin. Mineral acids are best used with melamine formaldehyde resin in amounts ranging from 5–10 percent by weight.

For the cement component, use may be made of ordinary gypsum cement prepared by calcination of gypsum rock at 350° F. under atmospheric conditions. It is preferred, however, to formulate the cementitious composition with alpha gypsum cement prepared by calcination of gypsum rock at lower temperatures, such as 250° F., under steam pressure. The latter provides cement particles having lower water absorption and less surface area per unit weight, whereby greater fluidity is secured with equivalent amounts of water and larger proportions of glass fiber may be incorporated as reinforcement and for purposes of introducing greater flexibility. Mixtures of ordinary gypsum cement and alpha gypsum cement may be used when desired.

In the practice of this invention, the gypsum cement in finely divided form is introduced into the aqueous solution of the resinous material. Addition is made without stirring until the cement particles have been thoroughly wet out in order to minimize formation of lumps. After the particles have been wet out, the composition is thoroughly mixed in a manner to secure proper distribution without introducing an excessive amount of air. From the time that the cement, resin and water are combined, the working life of the cementitious putty-like composition is limited. Without the use of retarders, the composition can be readily worked for about 10–20 minutes. With retarders, the working life may be increased to about 30–40 minutes. In practice, it has been found desirable to prepare a solution of a suitable retarder for the gypsum cement and separately to dissolve the amide-aldehyde resin in the prescribed amount of water. The retarder and resin solution are then combined and the gypsum cement is introduced without stirring until thoroughly wet out and then stirred under controlled conditions so as to not work in air bubbles, especially if substantially void free layers are desired.

Application of the cement slurry to form layers 11 and 12 in the porous base board 10 may be accomplished by troweling, by spraying technique or by other suitable means. Especially when the slurry is troweled into the porous bonded base fabric, it appears as though there is a lack of penetration of the slurry into the fabric and the amount of anchorage which can otherwise be achieved often is insufficient to resist delamination. The reason for this failure to penetrate is not clear, but it is believed to follow from the high viscosity of the slurry coupled with the fine pores of the base fabric and the presence of phenol formaldehyde resin or other water repellent resin on the adjacent glass fiber surfaces to resist wetting out by the aqueous slurry. It has been found that anchorage of the applied cementitious composition can be greatly improved if the glass fibers on the surface of the porous bonded core to be coated are first treated with a suitable wetting agent, such as a cationic wetting agent of the type octadecylamine acetate, or a Werner complex compound having an acido group greater than 10 carbon atoms consolidated with a trivalent nuclear chromium atom, or an organo-silicon compound formulated with an organic group of relatively long chain length. Treatment with 0.2–2.0 percent solutions or dispersions is sufficient to achieve the desired wetting out.

When a spraying technique is employed for depositing the layer of cementitious material on the prepared surface of the bonded base fabric, it is possible to incorporate the glass fiber reinforcement by simultaneously spraying the slurry and the fibers in the desired concentration from separate sources, as by the use of a gun having concentric barrels for mixing the materials prior to deposition or from separate sources for mixing upon deposition. By this technique, it is possible to introduce glass fiber reinforcement in concentrations greater than 10 percent by weight, but it is seldom desired to exceed 20 percent by weight fiber in the cementitious layers. Improved results are also secured when the reinforcing fibers are also treated with the wetting agent to achieve better integration with the formed cement. Even though sufficient bond between laminae can be achieved in the practice of this invention, it has been found that failure of the panel or board often occurs because of pulling apart or separation responsive to opposed forces operating within the bonded core. A further important concept of this invention resides in means for obviating failure by delamination or by pulling apart in the area of the porous bonded core. Such means comprises transverse reinforcement in the form of cross stitched threads of glass fibers which bind the core from side wall to side wall and serves to integrate and bind the outer layers thereto when looped ends of the integrating thread or cord are allowed to extend from the walls of the core and embed within the cementitious composition. This technique, illustrated in Figures 4–6 inclusive, comprises a porous glass fiber bonded base board 10 stitched with threads, yarns or strands 14 of glass fibers, preferably having looped ends 15 extending outwardly from the face of the board for anchorage into the cement slurry as by embedding therein when the slurry is applied. Thus, the continuous threads 14 of glass fibers form a part of the cement slurry and the porous base board so as to tie the two together in a manner to resist separation by forces incident to normal use.

In practice, strands or threads of continuous glass fibers are stitched through the base board in closely spaced centers, such as about on 2 inch centers. When looped ends are provided to extend outwardly from the face of the board, the length of the loops preferably are dimensioned to be less than the thickness of the cement layer 11 or 12 to be formed thereon. Instead of strands or threads of continuous fibers, yarns of discontinuous fibers felted together and drafted to endless lengths may be used. The looped ends of the stitched yarns or strands function, in addition, as reinforcing elements for the cementitious material. When sufficient glass fiber is introduced by way of embedment of the loops in the cementitious material, the amount of glass fiber 13 incorporated into the slurry by way of reinforcement may be reduced to about 2–3 percent or even completely eliminated. When the stitched threads or cords are drawn tightly against the face of the core, it is expedient lightly to coat the face with a cementitious composition or other bonding agent to anchor the threads.

When a moisture barrier is desired in a structural board, one of the faces of the porous base board may be coated with a substantially continuous layer 16 of an asphaltic material or resinous material preferably applied by way of a hot melt or from an aqueous dispersion having high solids content. A construction of this type is illustrated in Figures 3 and 6. When the practice heretofore described for integrating the applied layers with the porous base board is employed for the purpose of preventing delamination, the looped ends 15 of the continuous glass threads or yarns become embedded in the moisture-barrier layer in the perparation of a composite well-bonded structure as illustrated in Figure 6.

By way of illustration, but not by way of limitation, the following sets forth examples of slurries which may be used in the practice of this invention and the method of fabrication in the manufacture of structural boards embodying the concepts of this invention:

*Example 1*

100 parts by weight alpha gypsum cement
25 parts by weight melamine formaldehyde resin powder (water soluble)
0.3 part by weight hydrochloric acid
4 parts by weight glass fibers in the form of yarns cut to 1 inch length
30 parts by weight water

*Example 2*

100 parts by weight gypsum cement
12.5 parts by weight melamine formaldehyde resin powder (water soluble)
1.5 parts by weight hydrochloric acid
5 parts by weight glass fibers in the form of strands sized with polyvinyl acetate and cut to ¾ inch lengths
30 parts by weight water

*Example 3*

100 parts by weight gypsum cement
37.5 parts by weight urea formaldehyde solution (66 percent solids)
1.0 part by weight tin chloride
3.0 parts by weight glass fibers in the form of threads cut to ½ inch lengths
17.5 parts by weight water

*Example 4*

100 parts by weight gypsum cement
18.7 parts by weight urea formaldehyde resin solution (66 percent solids)
0.25 part by weight ammonium chloride
4 parts by weight staple fibers chopped to lengths ranging from ½–2 inch lengths
24 parts by weight water

*Example 5*

100 parts by weight gypsum cement
12.5 parts by weight melamine formaldehyde resin
1.0 part by weight hydrochloric acid
0.1 part by weight retarder
2 parts by weight glass fibers cut to 1 inch lengths
30 parts by weight water

*Example 6*

100 parts by weight alpha gypsum cement
25 parts by weight urea formaldehyde resin water solution (66 percent solids)
2 parts by weight tin chloride
0.01 part by weight retarder
30 parts by weight water In the preparation of the slurry of the above compositions, the melamine resin or the urea formaldehyde resin is slowly dissolved in water and then the catalyst is incorporated. The gypsum is introduced into the acidified resin solution without agitation until all of the gypsum cement has been thoroughly wet out. Then the composition is stirred to a creamy consistency without introducing air bubbles.

The surface of a porous glass fiber board bonded with phenol-formaldehyde resin and molded to a density of 9 pounds per cubic foot and a thickness of about ¾ inch is treated with an octadecylamine acetate and then a slurry of the type compounded of Examples 1–4 is troweled onto the surface to form a smooth, substantially non-porous layer having a thickness of about ⅛ inch. The cement layer becomes hardened upon standing and, for cure of the resinous component when formulated of melamine formaldehyde resin, the board is heated to 125° F. for about 5 minutes and then to 150° F. for 15 minutes. Instead of forming a smooth surface on the applied cement layer, the surface may be textured by curing in contact with a suitable mold or the desired texture may be introduced in advance of the curing operation while the cementitious composition is still in a formable stage.

For sound insulation, it has been found beneficial to fabricate the panels with a plurality of openings 20 extending less than the full distance through the composite layers, such as to the surface of the porous core of bonded glass fibers or partially therethrough for the purpose of dissipating sound vibrations. Such openings may be formed by the use of inserts in the preparation of the cementitious layer or else they may be formed therein subsequently to curing, as by a drilling operation.

In the event that it is desirable to manufacture a board having a vapor barrier, one face may be manufactured with a cementitious layer and the other face coated with an asphaltic layer applied as a hot metal by conventional means. In the event that the base board has been previously stitched with continuous glass fiber strands or yarns to provide looped ends, a cementitious composition having a lower concentration of reinforcing glass fibers may be used, such as in Example 5. In the event that the amount of fiber in the looped end portions is considerable, a cementitious composition prepared of Example 6, without glass fiber reinforcement, may be used.

It will be apparent from this description that there has been provided means for manufacturing a substantially inorganic structural board characterized by high strength and having a substantially non-porous outer surface which permits surface treatment, such as painting or coating with conventional paints or lacquers. The composite board which is formed is not subject to delamination and embodies a highly porous core which enables beneficial use thereof for heat and sound insulation, structural boards and panels, partition panels, siding and the like.

It will be understood that changes may be made in the details of the construction and fabrication without departing from the spirit of the invention, especially as defined in the following claims.

We claim:

1. A structural board comprising a core of glass fibers bonded into a porous self-sufficient layer, a layer of a substantially inorganic cementitious material integrated with at least one of the faces of the core, the cementitious layer being formed of a composition consisting essentially of an amide-aldehyde resin selected from the group consisting of urea formaldehyde and melamine formaldehyde and gypsum cement present in the ratio of 5–25 parts by weight of resin to 95–75 parts by weight of cement and containing from 1 to 10 percent by weight of glass fibers in the form of strands cut to lengths ranging from ¼–4 inches, and a wetting agent on the surface portion of the bonded glass fibers beneath the cementitious layer applied in advance of the cementitious layer to improve the penetration and anchorage thereof to the porous bonded layer of glass fibers.

2. A structural board comprising a relatively thick core of glass fibers bonded into a self-sufficient porous layer, a relatively thin layer of an inorganic cementitious material integrated with at least one of the faces of the core, the cementitious layer being formed of a composition consisting essentially of an amide-aldehyde resin selected from the group consisting of urea formaldehyde and melamine formaldehyde and a gypsum cement reinforced with from 1 to 10 percent by weight of glass fibers of reinforcing length and present in the ratio of 5–25 parts by weight of resin and 95–75 parts by weight of gypsum cement, and a wetting agent on the surface portion of the bonded glass fibers beneath the cementitious layer applied in advance of the cementitious layer to improve the penetration and anchorage thereof to the porous bonded layer of glass fibers.

3. A structural board as claimed in claim 1 in which the glass fibers in the strands are sized with a melamine-formaldehyde resinous base.

4. A structural board as claimed in claim 1 in which the glass fiber strands are sized with a polyvinyl acetate resinous base.

5. A structural board as claimed in claim 1 in which a layer of the cementitious composition is integrated with one face of the core and a layer of asphaltic material is integrated with the other face to provide a vapor barrier.

6. A structural board comprising a core of glass fibers bonded into a relatively thick porous layer, a relatively thin layer of a substantially inorganic cementitious material integrated with at least one face of the core and formed of a composition consisting essentially of an amide-aldehyde resin selected from the group consisting of urea formaldehyde and melamine formaldehyde and gypsum cement present in the ratio of 5–25 parts by weight of resin to 95–75 parts by weight of cement, continuous threads of glass fibers stitched back and forth through the core with looped ends extending therefrom and embedded within the cementitious layer, and a wetting agent on the surface portion of the bonded glass fibers beneath the cementitious layer applied in advance of the cementitious layer to improve the penetration and anchorage thereof to the porous bonded layer of glass fibers.

7. A structural board comprising a core of glass fibers bonded into a porous layer, a relatively thin layer of a substantially inorganic cementitious material integrated with at least one face of the core and formed of a composition consisting essentially of an amide-aldehyde resin selected from the group consisting of urea formaldehyde and melamine formaldehyde and gypsum cement present in the ratio of 5–25 parts by weight resin to 95–75 parts by weight cement and embedded therein from 1 to 10 percent by weight of glass fibers of reinforcing length, continuous threads of glass fibers stitched back and forth through the core with looped ends extending therefrom and embedded within the cementitious material whereby the glass fibers supply some of the reinforcement to the cementitious layer and impart transverse strength to the structure, and a wetting agent on the surface portion of the bonded glass fibers beneath the cementitious layer applied in advance of the cementitious layer to improve the penetration and anchorage thereof to the porous bonded layer of glass fibers.

8. A structural board as claimed in claim 7 in which the amide-aldehyde resin comprises melamine-formaldehyde resin.

9. A structural board as claimed in claim 7 in which the amide-aldehyde resin comprises urea-formaldehyde resin.

10. A structural board as claimed in claim 7 in which the threads of glass fibers are stitched on about 2 inch centers.

11. A structural board as claimed in claim 1 in which acoustical openings extend partially through the thickness of the composite structure.

12. A structural board as claimed in claim 7 in which a layer of cementitious material is integrated with one face of the board and a layer of asphaltic material is integrated with the other face with the looped ends of the threads stitched therethrough embedded within the respective layers.

References Cited in the file of this patent

UNITED STATES PATENTS

| Number | Name | Date |
|---|---|---|
| 2,008,718 | Jenkins | July 23, 1935 |
| 2,137,756 | Gould et al. | Nov. 22, 1938 |
| 2,240,529 | Tyce | May 6, 1941 |
| 2,252,157 | Bergin | Aug. 12, 1941 |
| 2,296,553 | Heritage et al. | Sept. 22, 1942 |
| 2,419,440 | Delmonte | Apr. 22, 1947 |
| 2,450,902 | Marberg | Oct. 12, 1948 |
| 2,517,906 | Mayfield | Aug. 8, 1950 |
| 2,566,619 | Lyon et al. | Sept. 4, 1951 |
| 2,571,343 | Dailey et al. | Oct. 16, 1951 |